Oct. 9, 1945.        W. J. O'CONNOR        2,386,339
ICE-PROOF WINDSHIELD
Filed Nov. 12, 1941        2 Sheets-Sheet 1
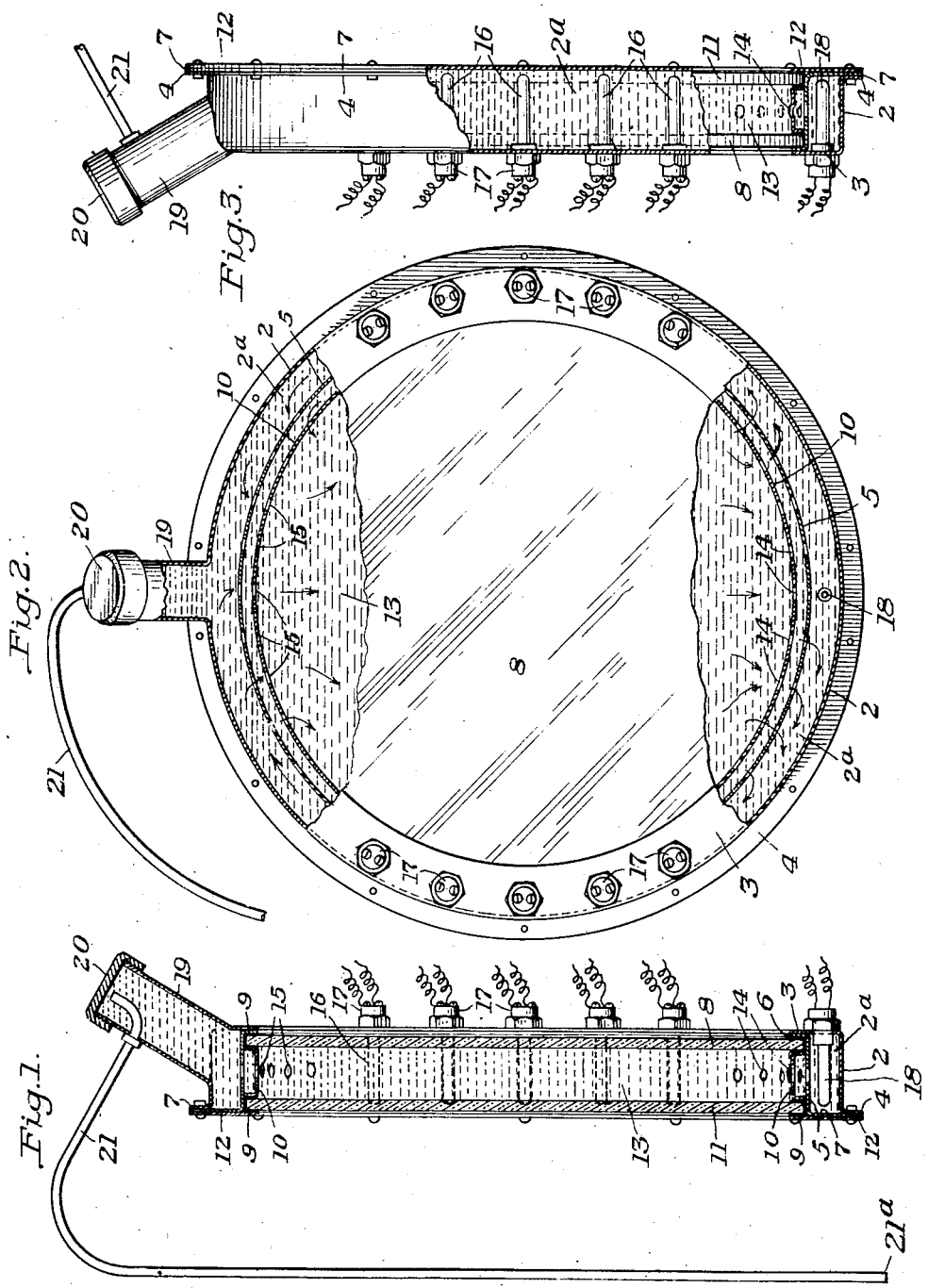
INVENTOR
Walter J. O'Connor Oct. 9, 1945.  W. J. O'CONNOR  2,386,339
ICE-PROOF WINDSHIELD
Filed Nov. 12, 1941  2 Sheets-Sheet 2
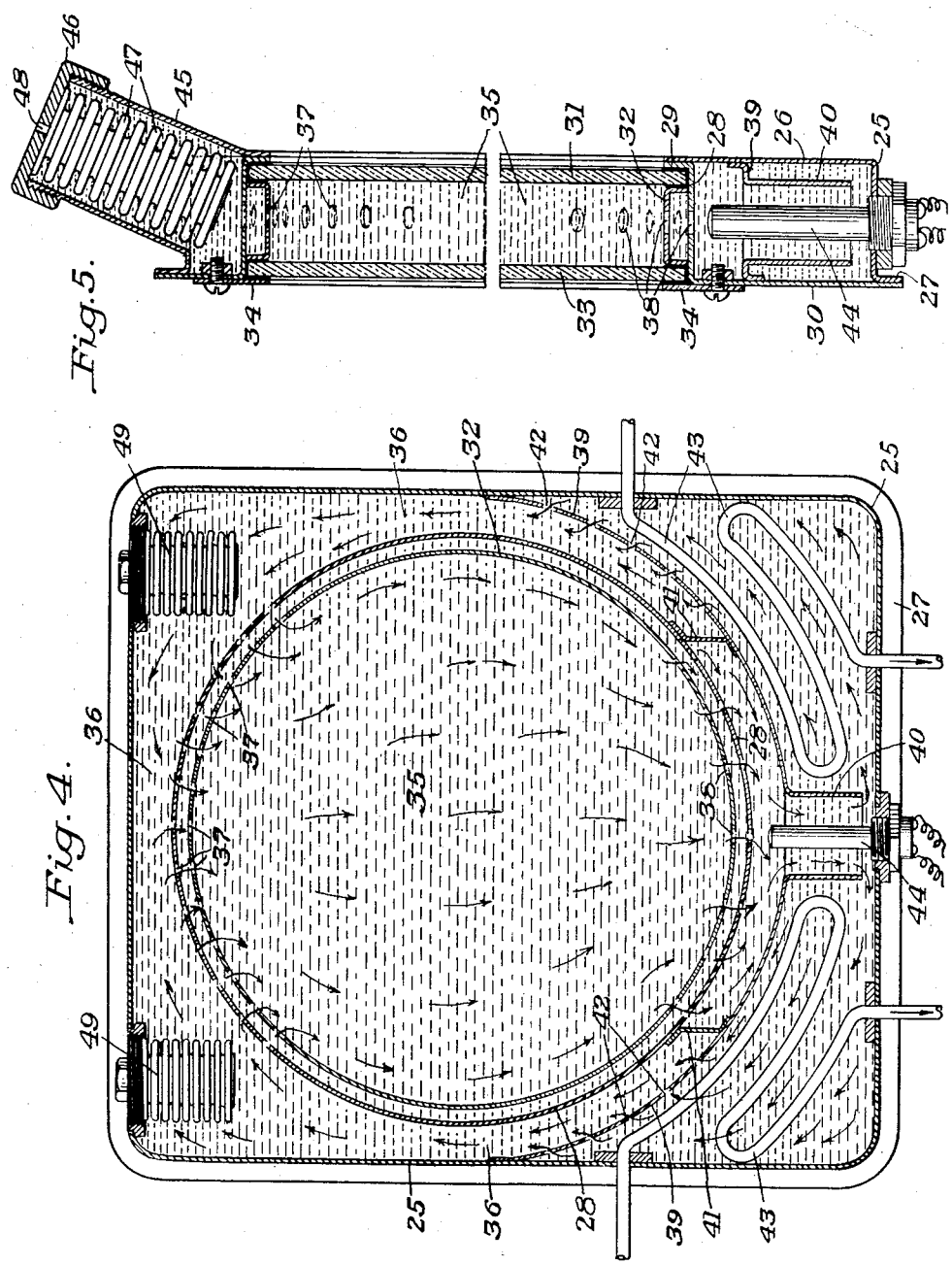
INVENTOR
Walter J. O'Connor
by his attorneys
Christy, Parmelee & Strickland Patented Oct. 9, 1945

2,386,339

UNITED STATES PATENT OFFICE 2,386,339

ICEPROOF WINDSHIELD

Walter J. O'Connor, Pittsburgh, Pa.

Application November 12, 1941, Serial No. 418,738

9 Claims. (Cl. 20—40.5)

This invention pertains to windshields for vehicles of various types including automobiles and locomotives and for airplanes, and is for a windshield of the type in which provision is made for the circulation of heated fluid between the spaced sheets of glass for the purpose of preventing the accumulation of ice on the exterior of the windshield and the formation of frost on the interior.

While the invention is applicable to various types of vehicles, it is especially applicable for use on airplanes, particularly those intended to fly at high altitude, where the accumulation of ice on the windshield presents a difficult problem, and where at the present time anti-freeze solutions are sprayed over the exterior of the windshield to prevent icing.

It has heretofore been proposed to form windshields having spaced lights of glass with an intervening body of fluid, but for various reasons such devices are not satisfactory for the use for which they are intended, and they are especially unsatisfactory for use on aircraft. In the first place many available fluids for use in the windshield have an index of refraction different from that of glass, or are less conductive to light than glass or air. Consequently it is desirable that the space between the two sheets of glass be relatively thin in order that the fluid will not unnecessarily obstruct the vision or refract light. Also for military planes which make violent manoeuvres at high speeds it is desirable that the volume of fluid be maintained relatively small in comparison with the thickness of the glass, in order to avoid undue strains when the course of the ship is suddenly changed. Windshields as heretofore constructed, using a heated fluid to prevent the formation of ice, depend upon the establishment of convective currents in the body of the fluid between the two sheets of glass. They contemplate, for example, the provision of heating means at the bottom of the windshield for heating the fluid, so that it may rise between the two sheets of glass and displace the colder fluid which lies above. The difficulty with this arrangement is that if the intervening film of liquid is relatively thin, the overlying fluid blocks the warmer fluid from rising, so that only a small portion of the windshield is kept clear of ice. Moreover such circulation as takes place cannot be controlled, and the field of vision of the pilot or operator is through a liquid in which there are oppositely moving currents of fluid of different densities. Moreover, at high altitudes especially, boiling of the liquid in contact with heaters may take place, causing the field of vision to be distorted by bubbles generated in the fluid.

The present invention is designed to eliminate these defects and to provide a controlled unidirectional circulation of the fluid in the field of vision with no possibility of bubbles circulating across the field of vision, and provides a windshield which permits a relatively thin film or body of fluid to be used between the separated lights of glass. The invention further provides a novel construction for the assembly of windshields of this character, and includes various other provisions to adapt the construction to use on aircraft where wide changes of atmospheric pressure are encountered, and to meet the possibility of the plane flying at times in an inverted position.

The invention may be more fully understood by reference to the accompanying drawings, in which Figure 1 is a transverse vertical section through a windshield embodying my invention;

Figure 2 is a view partly in elevation and partly in section, showing the windshield as viewed by the operator;

Figure 3 is partly a side elevation and partly a section of the windshield shown in Figure 2;

Figure 4 is a longitudinal vertical section through a slightly modified form of windshield; and Fig. 5 is a transverse vertical section across a windshield generally similar to that shown in Fig. 4, but wherein there are one or more extensions on the frame to provide filling openings.

Referring first to the form of invention illustrated in Figures 1–3 inclusive, the windshield is preferably constructed of a metal frame comprising an outer member 2, having an inwardly turned flange 3 and an outwardly turned flange 4. For securing the most advantageous circulation of fluid and the avoidance of spaces in which there is little circulation, the windshield is preferably circular, but it may be elliptical, or in the form of a square with rounded corners, or in various other shapes. For the purpose of illustration, however, it is illustrated as being round, this being the most efficient shape. Within the outer frame member 2 and spaced therefrom is an inner annular frame member 5, having an inwardly turned flange 6 which lies inside the flange 3, and an outwardly turned flange 7 that overlaps the flange 4. This construction of the two frame members provides a frame with an internal annular fluid-circulating passage 2a formed therein, the inner and outer walls of which passage are constituted by the members 2 and 5, and the side walls of which are constituted by the flanges 3 and 7. The two main frame members 2 and 5 may be secured together in any suitable manner, as by having the contacting flange portions 3 and 6 and 4 and 7 welded, forming a liquid-tight joint.

The overlapping flanges 3 and 6, which extend inwardly, form an annular ledge or lip against which the inner sheet of glass designated 8 is set. Around the peripheral edge of the sheet of glass there may be a suitably formed packing ring made of metal or synthetic rubber or any other suitable composition, this ring of packing being designated as having a U-shaped cross-section and marked 9 in the drawings.

Set inside the frame against the sheet of glass 8 is a spacing ring 10, preferably in the form of a channel-shaped annulus of light sheet metal having the flanges thereof turned outwardly to contact the inner wall of frame member 5. This spacing ring serves to hold the sheet of glass 8 tight against the inwardly turned flange 3—6. A second sheet of glass 11 is set into the frame and is held in spaced relation to the first sheet by the spacing ring 10, this spacing ring 10 holding the sheet of glass 11 substantially flush with the face of the annular frame. The sheet of glass 11 in turn is held in place by a ring or annulus 12, which is bolted to the flange formed by the projecting, overlapping edges of the flanges 4 and 7. A packing ring 9 also surrounds the peripheral edge of the sheet of glass 11 and is similar to the packing ring 9 on the sheet of glass 8. The windshield thus comprises a metal frame having a channel 2a around its periphery and with a fluid-circulating space 13 between the two sheets of glass 8 and 11, the space 13 between the sheets of glass being separated from the annular channel in the frame.

At the bottom of the windshield the space 13 opens into the annular passage 2a through a plurality of openings 14, these openings being formed both in the spacer 10 and in the portion of the frame member 5 which provides the inner wall of the passage. Similarly openings 15 at the top of the frame establish communication between the space 13 and the channel 2a.

Mounted on the inner face of the frame of the windshield at each side thereof are one or more, preferably several, electric heating elements 16, having terminals 17 at the inner face of the frame to which current supply wires may be attached. Heaters of this kind are well known to those skilled in the art, and are frequently referred to as "immersion heaters." The heaters extend only into the passage 2a and serve to heat the fluid in this passage. The heating of the fluid in the passage occurs only at the sides of the frame. This results in the setting up of a thermo-syphon circulation of the fluid which fills the space between the two panes of glass and which also fills the channel or duct 2a. The fluid upon becoming heated circulates toward the top of the frame where it flows through the openings 15 into the space 13 between the two panes of glass, displacing the colder fluid which flows out the openings 14 and which flows in each direction from the bottom of the frame up toward the heaters. For controlling the temperature of the fluid a thermostat 18 is located in the duct 2a at the very bottom of the frame, where it is responsive to the coolest fluid in the windshield. Because of the disposition of the heating elements entirely in the side channels or ducts between the top and the bottom of the window, a thermo-syphon circulation can be maintained across the field of vision whether the window is inverted or is in an upright position.

At the top of the frame there is shown a filling spout 19 with a removable cap 20. Leading from a point immediately over the cap is an overflow pipe 21 that rises to a point higher than the top of the cap, and then turns back in the reverse direction and its lower end 21a, as shown in Figure 1, is below the bottom of the windshield. This pipe allows the fluid in the windshield to expand upon being heated and prevents the generation of undue pressure in the windshield. At the same time because of the length of the pipe fluid cannot run out of the pipe even when the plane is flying in an upside-down position, unless there is a pressure within the windshield to force it out. The pipe 21 also serves as a vent to relieve any gases or entrained air which may be released from the fluid when it is heated.

The outwardly projecting flange on the frame formed by the overlapping flanges 4 and 7 of the two frame members 2 and 5 provides a support for attaching the windshield into the fuselage of the plane, or into the vehicle or craft on which it is mounted.

The frame itself may be of relatively light construction and it can be readily assembled. The space 13 between the two sheets of glass may be relatively thin as compared to the overall dimensions of the windshield, and in this respect the drawings must not be construed as necessarily showing the best proportions, as the thickness of the chamber 13 may be varied upon experimentation to determine the most efficient proportions and the most desirable velocity for the circulation of the fluid. The liquid circulates under a thermo-syphon action; all of the liquid moving across the plane of vision is flowing downwardly. All of the uprising currents are in the ducts or channel provided in the frame of the windshield. Uniform heating of the surface of the glass is therefore assured. Any gas bubbles that might be generated due to the heating of the fluid, particularly at the low pressure encountered at high altitudes, will flow through the ducts to the vent pipe 21, and none of these bubbles will circulate across the field of vision.

Figs. 4 and 5 illustrate modifications which are generally similar to the windshield previously described but wherein I have illustrated a provision for heating the fluid by means of heat-exchange coils immersed in the fluid, and through which hot oil from the crank cases of the airplane engines, hot water from the radiators of the engines of the plane or motor vehicle, or steam in the case of a steam locomotive, may flow in lieu of using electric heaters. In the windshield shown in these views the frame itself is of a generally rectangular shape, but the field of vision defined by the glass plates is circular. In both Figures 4 and 5 the general construction is substantially the same, the only difference being in the disposition of the expansible and compressible elements hereinafter referred to, and like reference numerals have therefore been used to designate the corresponding parts. The frame is constructed similarly to the one described in connection with Figures 1–3, there being an outer sheet metal frame member 25 having a long inwardly turned flange 26 and a short outwardly turned flange 27. There is an inner frame member 28, having a short inwardly turned flange 29 and a long outwardly turned flange 30. The overlapping flanges 27 and 30 are welded together to form a unitary, outwardly turned flange, and the overlapping portions of the flanges 28 and 29 are welded together to form an inwardly turned flange against which the inner light of the glass 31 is held. At 32 is a spacer, similar to the spacer 10, and 33 designates the outer sheet of glass which is confined against the spacer 32 and by an annulus 34 bolted to the exterior of the frame of the windshield. The space 35 between the two sheets of glass is completely surrounded by the member 28 and outside the member 28 and inside the member 25 is a fluid-receiving chamber 36. Instead of this chamber being in the form of an annular duct, as described in connection with Figures 1, 2, and 3, it is in the form of a rectangle around the circular field of vision. However, it confines the circulation of fluid in the same way as described in connection with the first three figures. In order to assure proper directional circulation of the fluid, holes 37 lead from the space 36 into the space 35 between the two sheets of glass at the top of the windshield. Similar holes 38 lead from the space 35 into the lower part of the space 36. There are curved baffle plates in the lower part of the space 36, these baffle plates being designated 39, and they extend from a point about half way up the windshield downwardly to a central discharge pipe 40. There are vertical baffle plates at 41. In a plane above the vertical baffle plates 41, the baffle plates 39 are provided with openings 42 for the upwardly circulating fluid. The downwardly circulating fluid is discharged through the pipe 40 into the space at each side of the frame under the baffles 39. In the space 36 under the baffles 39 are heat transfer coils 43. As previously indicated, hot oil, water, or steam may be circulated through these coils, depending upon the character of vehicle on which the windshield is mounted. This type of heater is particularly desirable for aircraft, as it may substantially reduce the area now required for water-cooling radiators on liquid-cooled engines, or it may be used to replace radiators for cooling the crank case oil, which are now sometimes required for aircraft use.

A thermostat 44 may be provided in the discharge pipe 40 for controlling the temperature to which the liquid in the windshield is heated. Here again the thermostat is located where it contacts the coolest fluid flowing through the windshield and assures of all liquid being heated to a temperature high enough to eliminate completely ice or frost on the surface of the windshield.

At the top of the frame, as shown in Figure 5, there is a filling spout 45 with a cap 46. In Fig. 4 the spout 47 is omitted, there merely being filling openings in the top of the shell. In order to relieve the pressure caused by the expansion of the fluid, without, however, providing any overflow, a Sylphon bellows 47 may be secured to the under side of the filling cap with the interior of the bellow opening to atmosphere through an opening 48. In addition to the Sylphon bellows used in the filling cap, or in lieu thereof, one or more such bellows may also be mounted in the top of the exterior frame member 25, as shown at 49 in Figure 4. These bellows open to the atmosphere the same as the bellows shown in Figure 5. When the liquid in the windshield expands upon being heated, thus creating a pressure, the Sylphon bellows collapse and accommodate the expanded volume of fluid without the generation of excessive pressure in the windshield. When the fluid in the windshield cools, the bellow expand. This arrangement is preferable under some circumstances to the one shown in Figures 1, 2, and 3, for the reason that there is no escape of the liquid from the windshield, and once the windshield has been filled and entrained air has been eliminated the device will operate for long periods of time without refilling. At the same time the expansion and contraction of the bellows allow the fluid to expand, but the windshield is entirely full of liquid at all times, so that there will not be bubbles to interfere with vision.

In both constructions there is a unidirectional flow of fluid across the field of vision maintained entirely by thermo-syphon action, and in each form the device is adapted for use on airplanes, which are subject to wide ranges of atmospheric pressure. It will, of course be apparent that the overflow arrangement of Figure 1 might be used on the windshield of Figure 4, or the Sylphon bellows of Figures 4 and 5 can be used in the construction shown in Figure 1.

While I have illustrated and described certain specific embodiments of my invention, it will be understood that this is by way of illustration and that various changes and modifications may be made within the contemplation of my invention and under the scope of the following claims. Also the term "glass" as used herein is intended to comprehend other transparent sheet material as, for example, transparent plastic materials.

I claim as my invention:

1. A windshield construction comprising an outer metal frame member having a long internal flange on one edge and a short external flange on the other edge, an inner frame member having a short internal flange that contacts the internal long flange of the first member and a long external flange on its other edge contacting the short external flange of the first member, the contacting flange portions of the two members being joined to make fluid-tight seams, a sheet of glass abutted against the internal lip formed by the contacting internal flanges, a second sheet of glass in the frame spaced from the first, and an annular retaining member holding the second sheet of glass in the frame, the frame thus constructed providing a fluid-circulating space between the inner and outer members, the inner frame member having oppositely positioned ports opening into the space between the two sheets of glass.

2. A windshield construction comprising an outer metal frame member having a long internal flange on one edge and a short external flange on the other edge, an inner frame member having a short internal flange that contacts the internal flange of the first member and a long external flange on its other edge contacting the short external flange of the first member, the contacting flange portions of the two members being joined to make fluid-tight seams, a sheet of glass abutted against the internal lip formed by the contacting internal flanges, a second sheet of glass in the frame spaced from the first and an annular retaining member holding the second sheet of glass in the frame, the frame thus constructed providing a fluid-circulating space between the inner and outer members, the inner frame member having openings therethrough at the top and bottom of the frame to provide for the circulation of liquid from the space in the frame to the space between the glass sheets, and heating means in the said space within the frame.

3. A windshield construction comprising an outer metal frame member having a long internal flange on one edge and a short external flange on the other edge, an inner frame member having a short internal flange that contacts the internal long flange of the first member and a long external flange on its other edge contacting the short external flange of the first member, the contacting flange portions of the two members being joined to make fluid-tight seams, a sheet of glass abutted against the internal lip formed by the contacting internal flanges, a second sheet of glass in the frame spaced from the first, an annular retaining member holding the second sheet of glass in the frame, the frame thus constructed providing a fluid-circulating space between the inner and outer members, the inner frame member having oppositely positioned ports opening into the space between the two sheets of glass, and compressible means mounted in the frame for relieving pressure in the windshield created by the expansion of the liquid.

4. A windshield construction comprising an outer metal frame member having a long internal flange on one edge and a short external flange on the other edge, an inner frame member having a short internal flange that contacts the internal long flange of the first member and a long external flange on its other edge contacting the short external flange of the first member, the contacting flange portions of the two members being joined to make fluid-tight seams, a sheet of glass abutted against the internal lip formed by the contacting internal flanges, a second sheet of glass in the frame spaced from the first, an annular retaining member holding the second sheet of glass in the frame, the frame thus constructed providing a fluid-circulating space between the inner and outer members, the inner frame member having oppositely positioned ports opening into the space between the two sheets of glass, and a Sylphon bellows mounted on the frame and immersed in the fluid with its interior opening to atmosphere to compensate for changes in the volume of the liquid in the windshield and frame with changes of temperature.

5. A windshield comprising a hollow frame defining an open field of vision, spaced transparent sheets over the open field of vision forming a window and, with the frame, providing a fluid receiving space between the transparent sheets, the hollow frame forming a peripheral duct entirely around the window, the frame having a series of ports therein across the top and across the bottom of the window establishing communication between the peripheral duct and the space between the transparent sheets, and heating means in the duct for liquid at each side of the window entirely intermediate the top and bottom whereby a thermo-syphon circulation of liquid may be maintained when the window is completely inverted.

6. A windshield comprising a hollow frame defining an open field of vision, spaced transparent sheets over the open field of vision forming a window and, with the frame, providing a fluid receiving space between the transparent sheets, the hollow frame forming a peripheral duct entirely around the window, the frame having a series of separated ports therein across the top and bottom of the window establishing communication between the peripheral duct and the space between the transparent sheets, heating means in the duct for liquid at each side of the window entirely intermediate the top and bottom whereby a thermo-syphon circulation of liquid may be maintained when the window is completely inverted, and means providing for the expansion and contraction of the liquid adapted to prevent spilling when the window is inverted.

7. A windshield comprising a hollow frame defining an open field of vision, spaced transparent sheets over the open field of vision forming a window and, with the frame, providing a fluid receiving space between the transparent sheets, the hollow frame forming a peripheral duct entirely around the window, the frame having a series of ports therein across the top and bottom of the window establishing communication between the peripheral duct and the space between the transparent sheets, and heating means in the duct for liquid at each side of the window, and an expansible and contractable member in the duct responsive to pressure of liquid in the duct to compensate for expansion and contraction of the liquid under heating and cooling and while maintaining the liquid under pressure.

8. A windshield comprising a frame having spaced transparent sheets providing a window with a fluid receiving space between the transparent sheets, a liquid circulating system including passageways and heating means for maintaining a thermo-syphon circulation of liquid from the bottom of the space externally thereof and into the top of said space, and an expansible element in the circulating system adapted to contract when the pressure on the liquid increases and which maintains the liquid in confinement to retard the boiling of the liquid at high altitudes.

9. A windshield comprising a supporting frame having spaced transparent sheets mounted therein in such manner as to provide a liquid circulating space inside the frame between the sheets, a continuous annular duct in the frame extending peripherally of the said space, said duct communicating with the space across the bottom of the window and across the top of the window only at the middle thereof and for a distance extending each side of the middle, and means for maintaining a thermo-syphon circulation of liquid through the space and in said duct.

WALTER J. O'CONNOR.